US012415199B2

(12) United States Patent
Hang et al.

(10) Patent No.: US 12,415,199 B2
(45) Date of Patent: Sep. 16, 2025

(54) SHORT AND SMALL CONTINUOUS SPRAYER

(71) Applicant: NINGBO JINYU TECHNOLOGY INDUSTRY CO., LTD., Ningbo (CN)

(72) Inventors: Cheng Hang, Ningbo (CN); Xianqiang Zhu, Ningbo (CN)

(73) Assignee: NINGBO JINYU TECHNOLOGY INDUSTRY CO., LTD., Ningbo (CN)

( * ) Notice: Subject to any disclaimer, the term of this patent is extended or adjusted under 35 U.S.C. 154(b) by 127 days.

(21) Appl. No.: 18/242,537

(22) Filed: Sep. 6, 2023

(65) Prior Publication Data

US 2025/0058341 A1 Feb. 20, 2025

Related U.S. Application Data

(63) Continuation of application No. PCT/CN2023/113041, filed on Aug. 15, 2023.

(51) Int. Cl.
*B05B 11/10* (2023.01)

(52) U.S. Cl.
CPC ........ *B05B 11/109* (2023.01); *B05B 11/1073* (2023.01); *B05B 11/1069* (2023.01)

(58) Field of Classification Search
CPC ............... B05B 11/109; B05B 11/1073; B05B 11/1069; B05B 11/1067; B05B 11/1066; B05B 11/1092
USPC ............ 222/321.7, 321.8, 320, 321.1, 321.2, 222/321.6; 239/329, 331, 333
See application file for complete search history.

(56) References Cited

U.S. PATENT DOCUMENTS 9,359,116 B2 * 6/2016 Beranger ............ B05B 11/1025
10,661,938 B2 * 5/2020 Elmeguenni ........... A45D 34/00

* cited by examiner

*Primary Examiner* — David J Walczak
(74) *Attorney, Agent, or Firm* — Jose Cherson Weissbrot

(57) ABSTRACT

A short and small continuous sprayer, including a spray head, where the spray head is connected to a valve rod, the valve rod is provided with a retaining cavity, the retaining cavity is provided with an upper spring, the upper spring is connected to a piston, a valve needle is arranged in the piston and sleeved on the valve rod, an inner cavity is formed between the piston and the valve needle, the piston is sleeved with a cylinder body, a liquid cavity is formed between the cylinder body and the piston, the cylinder body is connected to a lower spring, the lower spring is connected to the valve needle, the cylinder body is provided with a moving cavity, and a steel ball is arranged in the moving cavity.

10 Claims, 5 Drawing Sheets

SHORT AND SMALL CONTINUOUS SPRAYER

CROSS-REFERENCE TO RELATED APPLICATIONS

The present application is a continuation of International Application No. PCT/CN2023/113041, with an international filing date of Aug. 15, 2023, the entire contents of all of which are incorporated herein by reference.

FIELD OF TECHNOLOGY

The present invention relates to the technical field of sprayers, in particular to a short and small continuous sprayer.

BACKGROUND

The sprayer, an abbreviation of spraying equipment, is an appliance that uses air suction to turn a chemical liquid or other liquids into mist and spray them evenly onto other objects. A sprayer includes a compression apparatus, a thin tube, a nozzle, etc. A pump is generally arranged in the sprayer. The pump, a machine configured to increase the pressure of liquid or gas and make it conveyed and flow, is an apparatus configured to move liquid, gas, or a special fluid medium, that is, a machine that does work on a fluid. Pumps are mainly configured to transport liquids including water, oil, acid and alkali liquids, emulsions, suspended emulsions, and liquid metals, and can also transport liquids, gas mixtures, and liquids containing suspended solids.

The existing sprayer is used in the cosmetic industries of perfumes, moisturizers, and the like. During use, a spray is completely sprayed by once pressing, such that the spray is not continuous enough, thereby having difficulty in effective utilization of a spraying range.

SUMMARY

An objective of the present invention is to propose a short and small continuous sprayer, to overcome the shortcomings existing in the prior art.

To achieve the above objective, the present invention adopts the following technical solution: a short and small continuous sprayer includes a spray head, where the spray head is connected to a valve rod, the valve rod is provided with a retaining cavity, the retaining cavity is provided with an upper spring, the upper spring is connected to a piston, a valve needle is arranged in the piston and sleeved on the valve rod, and an inner cavity is formed between the piston and the valve needle; the piston is sleeved with a cylinder body, a liquid cavity is formed between the cylinder body and the piston, the cylinder body is connected to a lower spring, and the lower spring is connected to the valve needle; the cylinder body is provided with a moving cavity, a steel ball is arranged in the moving cavity, and the moving cavity is provided with a suction tube in a communication manner; and the valve rod moves down to drive the valve needle and the piston to move down to increase a liquid pressure in the liquid cavity, the lower spring is compressed, and when the liquid pressure in the liquid cavity is increased till a sum of the liquid pressure and an elastic force of the lower spring is greater than an elastic force of the upper spring, the piston moves up, the piston is separated from the valve needle, a liquid in the liquid cavity flows into the inner cavity from a gap between the piston and the valve needle, and the liquid in the inner cavity enters the spray head through the valve rod.

As a further description of the above technical solution, a flow channel is formed in a center of the valve rod, an annular bulge portion is arranged on an inner wall of the flow channel, and the valve rod is provided with a clamping ring.

As a further description of the above technical solution, the valve needle is fixedly connected to the valve rod, the valve needle is provided with a recess portion, the bulge portion is embedded into the recess portion, the valve needle is provided with a cut surface and a press-fit portion, and the press-fit portion is shaped like an annular inclined cut surface.

As a further description of the above technical solution, the piston is provided with an upper mounting portion fixedly connected to one end of the upper spring, the other end of the upper spring is fixedly mounted in the retaining cavity, and an attaching portion is arranged below the upper mounting portion.

As a further description of the above technical solution, the valve rod is sleeved with a bushing, the bushing is provided with a sealing portion and fixedly mounted with a small gasket, and the small gasket is fixedly mounted with a middle sleeve.

As a further description of the above technical solution, the middle sleeve is provided with a clamping portion and fixedly mounted with a large gasket, the large gasket is fixedly mounted on the cylinder body, and the cylinder body is fixedly connected to the middle sleeve.

As a further description of the above technical solution, the cylinder body is provided with a through hole, an embedded groove, and a recess, the embedded groove is attached to the sealing portion, and the recess is attached to the clamping portion.

As a further description of the above technical solution, an inward retraction portion is arranged on an inner wall of the moving cavity, a clamping ball is fixedly mounted on the inner wall of the moving cavity and arranged above the steel ball, and a liquid hole is formed below the moving cavity.

As a further description of the above technical solution, a channel is arranged below the liquid hole, a flange is arranged on an inner wall of the channel, and the suction tube is arranged in the channel.

As a further description of the above technical solution, the spray head is provided with a nozzle, fixedly mounted with a protective shell, and fixedly connected to the valve rod.

The above technical solution has the following advantages or beneficial effects:

1. The protective shell is pressed to drive the valve needle and the piston to move down, such that the liquid cavity generates the liquid pressure; in cooperation with the elastic force generated by compression of the lower spring, the sum of the liquid pressure and the elastic force of the lower spring acts on the upper spring, and the piston is separated from the valve needle and moves up in the retaining cavity; and in this case, the liquid in the liquid cavity continuously flows into the inner cavity from the gap between the piston and the valve needle and is conveyed upwards through the flow channel in the center of the valve rod, such that a spray can be continuously sprayed by once pressing, thereby effectively prolonging continuous spraying time of the spray.

2. The spray is sprayed continuously, and the sprayer can be rotated according to a range of application, such that the spray after a single press can cover a larger range for easy use.
3. When the amount of the spray is small, the sum of the liquid pressure and the elastic force of the lower spring can be reduced by shortening the length of pressing, such that the less liquid flows into the inner cavity, thereby saving the liquid while implementing flexible use.
4. The valve needle is provided with the cut surface, such that the large gap can be formed between the bulge portion in the flow channel of the valve rod and the cut surface of the valve needle, thereby facilitating the liquid in the inner cavity to be rapidly conveyed upwards from the flow channel in the valve rod.
5. The valve needle is provided with the recess portion, and the recess portion is attached to the bulge portion in the flow channel of the valve rod, such that the valve needle can be more stably mounted on the valve rod; and the valve needle and the valve rod are fixed through adhesion and clamped with each other at the recess portion and the bulge portion, such that when the valve rod moves down, the valve needle can be synchronously driven to move down, thereby avoiding relative sliding between the valve needle and the valve rod due to loosening of the valve needle and the valve rod thanks to aging of adhesion after long-time use.
6. The valve needle and the valve rod are fixed through adhesion and clamped with each other at the recess portion and the bulge portion, such that double fixation can avoid the situation that when the liquid in the inner cavity is rapidly conveyed upwards from the flow channel in the valve rod, the liquid impacts the valve needle upwards to damage the adhesion between the valve needle and the valve rod, causing the valve needle to separate from the valve rod.
7. The piston compresses the valve needle under the action of the upper spring, and a contact surface between the piston and the valve needle is added by arranging the press-fit portion shaped like the annular inclined cut surface on the valve needle, thereby enhancing the sealing property when the piston is in contact with the valve needle.
8. When the press is released, the lower spring rebounds to drive the valve needle and the valve rod to move up, and the clamping ring arranged on the valve rod can hook the bushing during the upward movement, to prevent the separation of the valve rod.
9. When the press is released, the lower spring rebounds, the valve needle moves up, the piston is in contact with the press-fit portion of the valve needle to implement closure, the valve needle continues moving up, and the pressure intensity of the liquid cavity is reduced, such that a suction force is generated to suck up the steel ball, and the liquid is supplied to the liquid cavity through the liquid hole; and the clamping ball is arranged above the steel ball to prevent the steel ball from separating from the moving cavity due to an excessive suction force when the steel ball is sucked up.

DESCRIPTION OF REFERENCE NUMERALS

Figure 1:
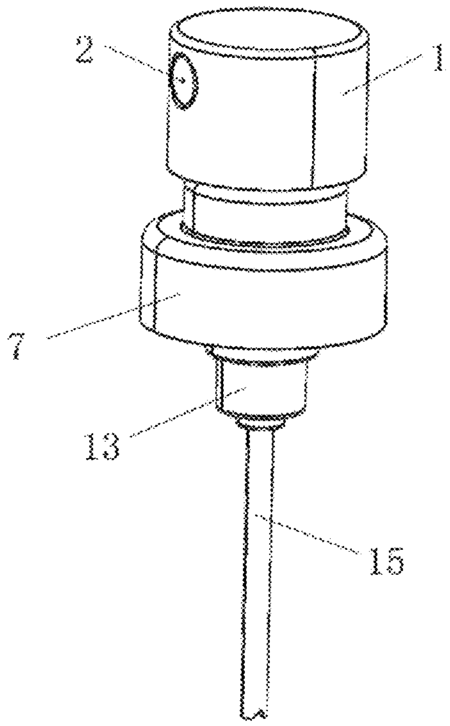
FIG. 1 is a three-dimensional view of a short and small continuous sprayer proposed by the present invention.
Figure 2:
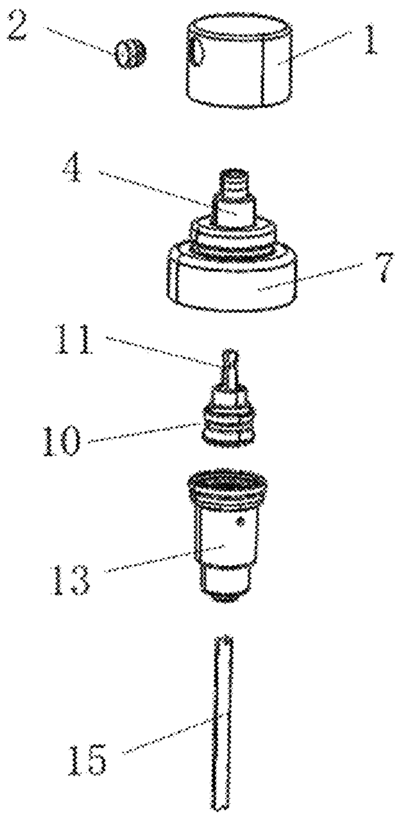
FIG. 2 is an exploded view of a short and small continuous sprayer proposed by the present invention.

1. protective shell; 2. nozzle; 3. spray head; 4. valve rod; 401. retaining cavity; 402. clamping ring; 403. bulge portion; 5. upper spring; 6. small gasket; 7. middle sleeve; 701. clamping portion; 8. bushing; 801. sealing portion; 9. large gasket; 10. piston; 1001. upper mounting portion; 1002. attaching portion; 1003. inner cavity; 11. valve needle; 1101. recess portion; 1102. cut surface; 1103. press-fit portion; 1104. lower mounting portion; 12. lower spring; 13. cylinder body; 1301. liquid cavity; 1302. embedded groove; 1303. inward retraction portion; 1304. clamping ball; 1305. liquid hole; 1306. flange; 1307. through hole; 1308. recess; 14. steel ball; and 15. suction tube.

DESCRIPTION OF THE EMBODIMENTS

The technical solutions in the embodiments of the present invention will be clearly and completely described below in conjunction with the accompanying drawings in the embodiments of the present invention. Apparently, the described embodiments are merely part rather than all of the embodiments of the present invention. All other embodiments obtained by those of ordinary skill in the art based on the embodiments in the present invention without creative efforts shall fall within the scope of protection of the present invention.

Referring to FIGS. 1-5, the present invention provides an embodiment of a short and small continuous sprayer, including a spray head 3, where the spray head 3 is provided with a nozzle 2 and fixedly mounted with a protective shell 1 and a valve rod 4, a flow channel is formed in a center of the valve rod 4, an annular bulge portion 403 is arranged on an inner wall of the flow channel, the valve rod 4 is provided with a clamping ring 402 and a retaining cavity 401, the retaining cavity 401 is provided with an upper spring 5, and the upper spring 5 is connected to a piston 10.

Figure 3:
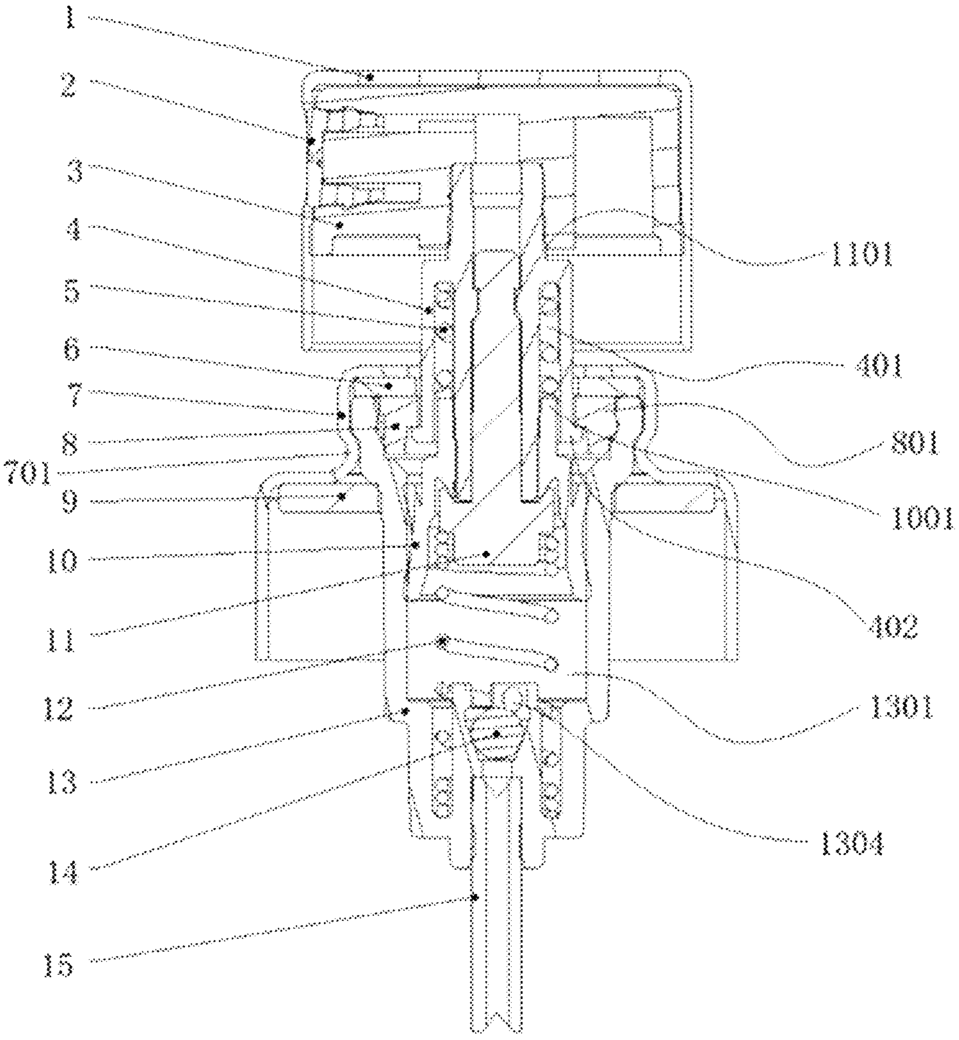
FIG. 3 is a sectional view of a short and small continuous sprayer proposed by the present invention.
Figure 6:
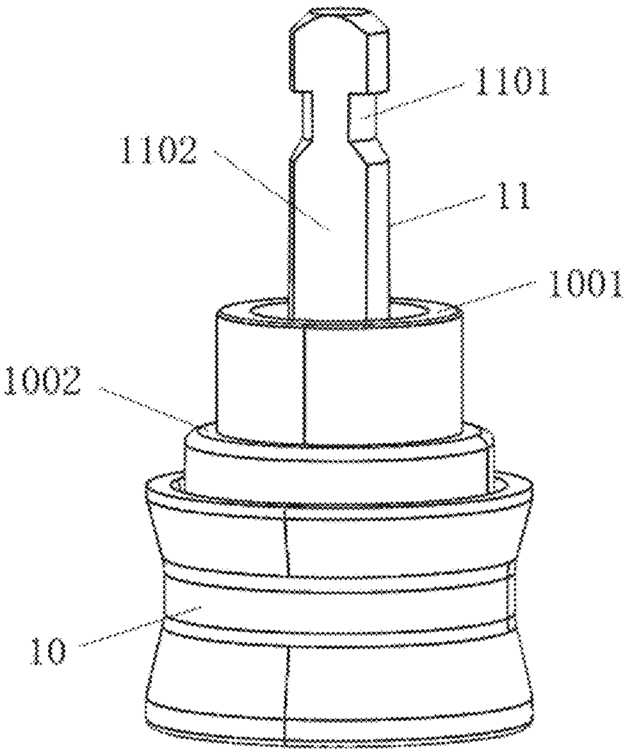
FIG. 6 is a schematic diagram of a piston in FIG. 2.
Figure 7:
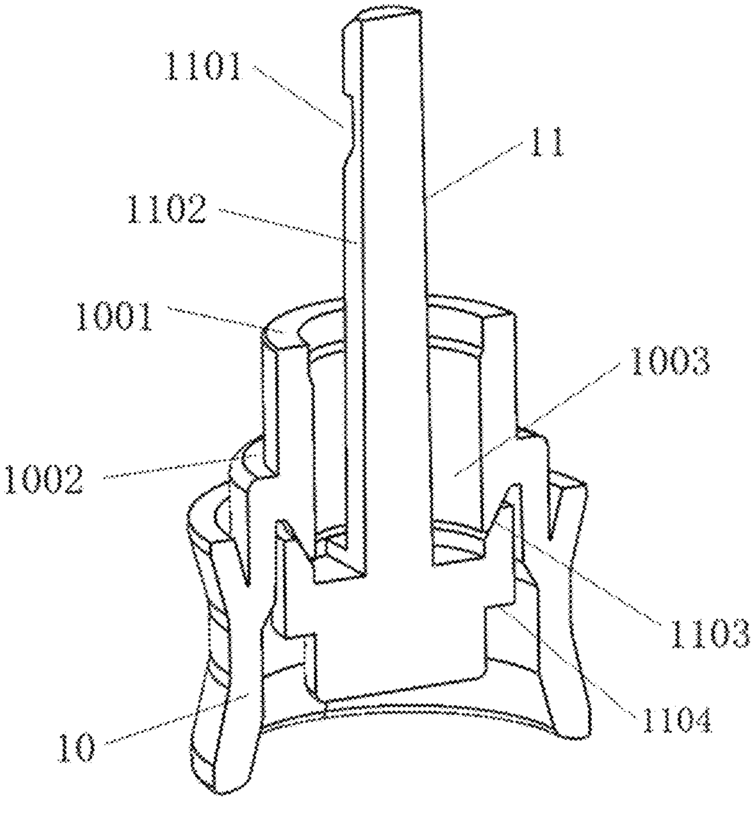
FIG. 7 is a side sectional view of a piston in FIG. 6.
Figure 8:
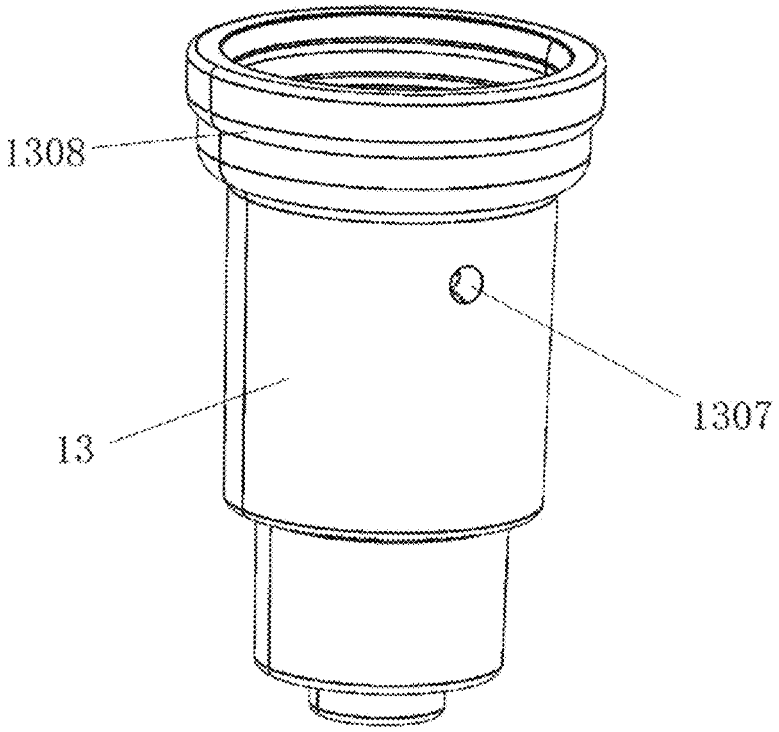
FIG. 8 is a schematic diagram of a cylinder body in FIG. 2.
Figure 9:
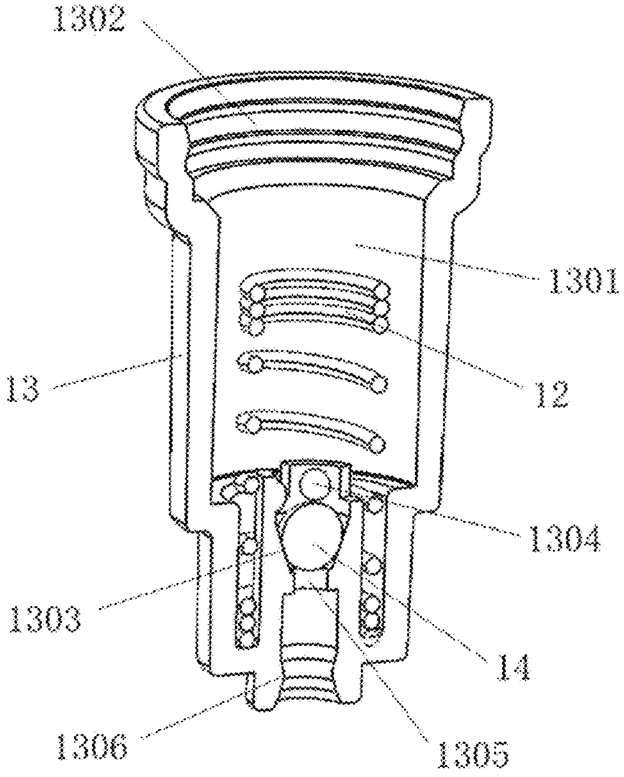
FIG. 9 is a sectional view of a cylinder body in FIG. 8.

Referring to FIG. 3 and FIGS. 6-7, the valve needle 11 is fixedly connected to the valve rod 4, arc surfaces on two sides of the valve needle 11 are adhered to the inner wall of the flow channel of the valve rod 4, the valve needle 11 is sleeved on the valve rod 4 and provided with a recess portion 1101, a bulge portion 403 is embedded into the recess portion 1101, and the bulge portion 403 is attached to the recess portion 1101, such that the valve needle 11 can be more stably mounted on the valve rod 4; the valve needle 11 and the valve rod 4 are fixed through adhesion and clamped with each other at the recess portion 1101 and the bulge portion 403, such that when the valve rod 4 moves down, the valve needle 11 can be synchronously driven to move down, thereby avoiding relative sliding between the valve needle 11 and the valve rod 4 due to loosening of the valve needle 11 and the valve rod 4 thanks to aging of adhesion after long-time use; the valve needle 11 is provided with a cut surface 1102, such that a large gap can be formed between the bulge portion 403 in the flow channel of the valve rod 4 and the cut surface 1102 of the valve needle 11, thereby facilitating a liquid to be rapidly conveyed upwards from the flow channel; because the recess portion 1101 is clamped with the bulge portion 403, the liquid can be prevented from impacting the valve needle 11 to damage the adhesion between the valve needle 11 and the valve rod 4 when conveyed upwards, thereby avoiding the separation of the valve needle 11 from the valve rod 4; and the valve needle 11 is provided with a press-fit portion 1103 shaped like an annular inclined cut surface, the piston 10 compresses the valve needle 11 under the action of the upper spring 5, and a contact surface between the valve needle 11 and the piston 10 can be added by the press-fit portion 1103, thereby enhancing the sealing property when the piston 10 is in contact with the valve needle 11.

Further, the piston 10 is provided with an upper mounting portion 1001 fixedly connected to one end of the upper spring 5, and the other end of the upper spring 5 is fixedly mounted in the retaining cavity 401, where the upper mounting portion 1001 provides a fixing point for one end of the upper spring 5 and serves as a support member for the upper spring 5, and the upper mounting portion 1001 supports the upper spring 5, thereby avoiding downward extension of the upper spring 5 due to its own gravity, reducing elastic force loss of the upper spring 5, and prolonging its service life; and an attaching portion 1002 is arranged below the upper mounting portion 1001, the valve needle 11 is arranged in the piston 10, and an inner cavity 1003 is formed between the piston 10 and the valve needle 11.

Figure 4:
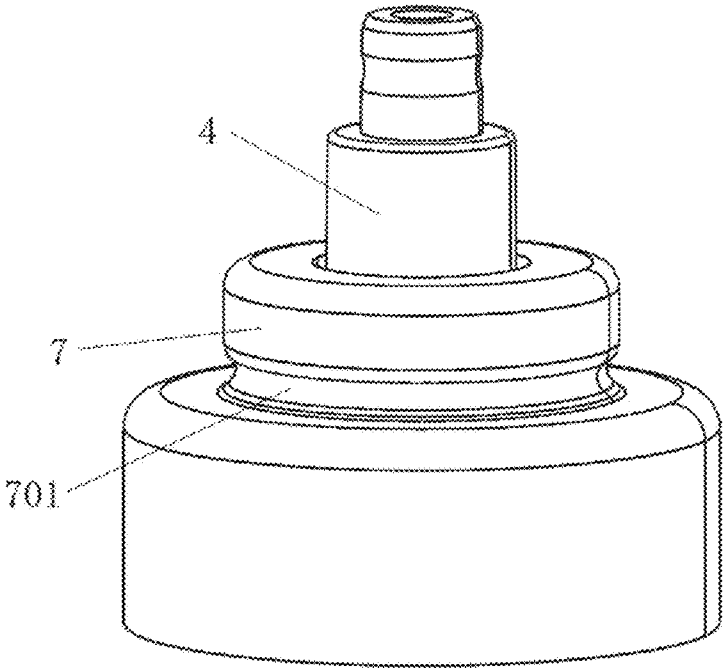
FIG. 4 is a schematic diagram of a middle sleeve in FIG. 2.
Figure 5:
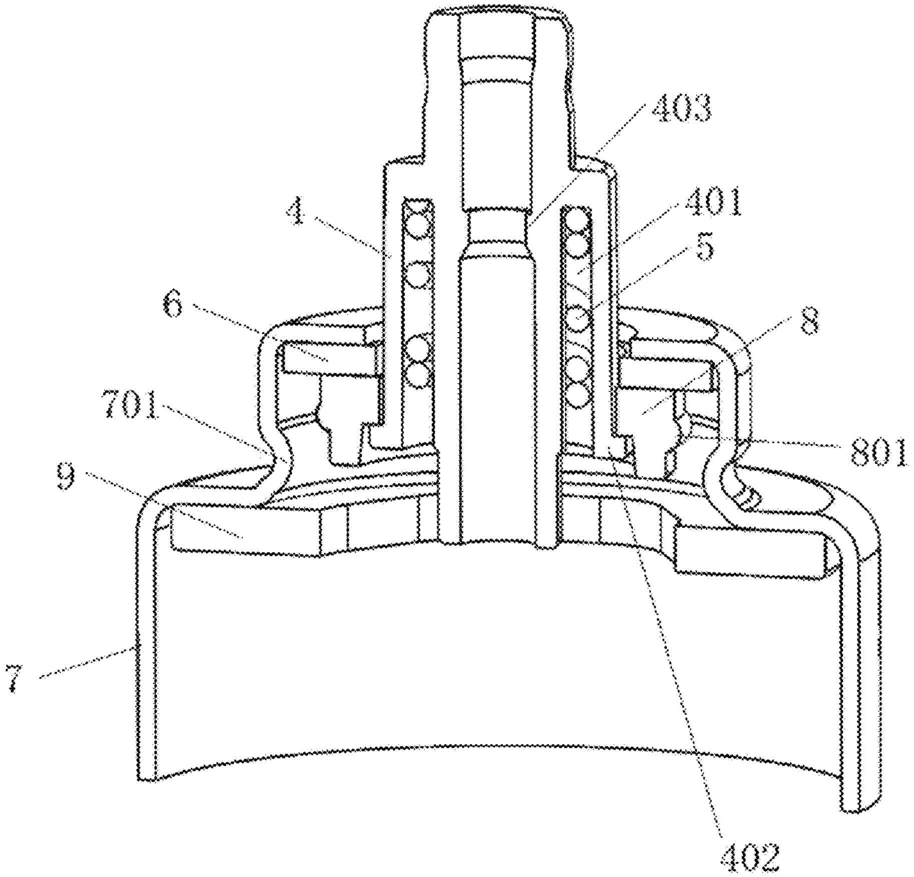
FIG. 5 is a sectional view of a middle sleeve in FIG. 5.

Referring to FIG. 3 and FIGS. 4-5, the valve rod 4 is sleeved with a bushing 8, the bushing 8 is provided with a sealing portion 801 and fixedly mounted with a small gasket 6, the small gasket 6 is fixedly mounted with a middle sleeve 7, the valve rod 4 penetrates through the middle sleeve 7, the middle sleeve 7 is provided with a clamping portion 701 and fixedly mounted with a large gasket 9, the piston 10 is sleeved with a cylinder body 13, the large gasket 9 is fixedly mounted on the cylinder body 13, and the cylinder body 13 is fixedly connected to the middle sleeve 7.

Specifically, referring to FIG. 3, FIG. 5, and FIGS. 8-9, a liquid cavity 1301 is formed between the cylinder body 13 and the piston 10, the cylinder body 13 is connected to a lower spring 12, the lower spring 12 is connected to the valve needle 11, the valve needle 11 is further provided with a lower mounting portion 1104, one end of the lower spring 12 is fixedly mounted on the lower mounting portion 1104, the cylinder body 13 is provided with a through hole 1307, an embedded groove 1302, and a recess 1308, the embedded groove 1302 is attached to the sealing portion 801, and the recess 1308 is attached to the clamping portion 701.

Further, the cylinder body 13 is provided with a moving cavity, a steel ball 14 is arranged in the moving cavity, the moving cavity is provided with a suction tube 15 in a communication manner, an inward retraction portion 1303 is arranged on an inner wall of the moving cavity, and a clamping ball 1304 is fixedly mounted on the inner wall of the moving cavity and arranged above the steel ball 14, where the clamping ball 1304 is arranged to avoid the separation of the steel ball 14 from the moving cavity when sucked up; and a liquid hole 1305 is formed below the moving cavity, a channel is arranged below the liquid hole 1305, a flange 1306 is arranged on an inner wall of the channel, and the suction tube 15 is arranged in the channel.

In the present application, the protective shell 1 is pressed to drive the nozzle 2 and the valve rod 4 to move down, and the valve rod 4 moves down to drive the valve needle 11 and the piston 10 to move down, such that a liquid volume and a pressure intensity in the liquid cavity 1301 are reduced and increased, a liquid pressure is gradually increased, the lower spring 12 is compressed, and a sum of the liquid pressure and an elastic force of the lower spring 12 acts on the upper spring 5; when the liquid pressure in the liquid cavity 1301 is increased till the sum of the liquid pressure and the elastic force of the lower spring 12 is greater than an elastic force of the upper spring 5, the piston 10 moves up in the retaining cavity 401 and is separated from the valve needle 11; in this case, the liquid in the liquid cavity 1301 continuously flows into the inner cavity 1003 from a gap between the piston 10 and the valve needle 11, is conveyed upwards through the flow channel in the center of the valve rod 4, enters the spray head 3, and is sprayed from the nozzle 2, such that a spray can be continuously sprayed by once pressing, thereby effectively prolonging continuous spraying time of the spray; and the sprayer can be rotated according to a range of application, such that the spray after a single press can cover a larger range for easy use.

It can be understood that during the upward movement of the piston 10, after the attaching portion 1002 on the piston 10 is in contact with the clamping ring 402 on the valve rod 4, the piston 10 stops moving up, thereby preventing the piston 10 from separating from the cylinder body 13 due to excessive upward movement, and preventing the liquid in the liquid cavity 1301 from seeping out from the outside of the piston 10.

In addition, when the amount of the spray is small, the sum of the liquid pressure and the elastic force of the lower spring 12 can be reduced by shortening the length of pressing, such that the less liquid flows into the inner cavity 1003, thereby saving the liquid while implementing flexible use.

When the single press is released, the lower spring 12 rebounds, the valve needle 11 and the valve rod 4 move up, the piston 10 is in contact with the press-fit portion 1103 of the valve needle 11 to implement closure, the valve needle 11 continues moving up, and the liquid volume and the pressure intensity in the liquid cavity 1301 are increased and reduced, such that the liquid generates a suction force to suck up the steel ball 14, and the liquid in the suction tube 15 is supplied to the liquid cavity 1301 from a gap between the steel ball 14 and the inward retraction portion 1303 through the liquid hole 1305.

It can be understood that when the lower spring 12 drives the valve needle 11 and the valve rod 4 to move up, the clamping ring 402 arranged on the valve rod 4 can hook the bushing 8 during the upward movement, to prevent the separation of the valve rod 4; in addition, the cylinder body 13 is provided with the through hole 1307, which facilitates the pressure intensity in the liquid chamber 1301 to be balanced more quickly after the press is released.

A working principle is as follows: the protective shell 1 is pressed to drive the nozzle 2 and the valve rod 4 to move down, and the valve rod 4 moves down to drive the valve needle 11 and the piston 10 to move down, such that the liquid volume and the pressure intensity in the liquid cavity 1301 are reduced and increased, the liquid pressure is gradually increased, the lower spring 12 is compressed, and the sum of the liquid pressure and the elastic force of the lower spring 12 acts on the upper spring 5; when the liquid pressure in the liquid cavity 1301 is increased till the sum of the liquid pressure and the elastic force of the lower spring 12 is greater than the elastic force of the upper spring 5. the piston 10 moves up in the retaining cavity 401 and is separated from the valve needle 11; in this case, the liquid in the liquid cavity 1301 continuously flows into the inner cavity 1003 from the gap between the piston 10 and the valve needle 11, is conveyed upwards through the flow channel in the center of the valve rod 4, enters the spray head 3, and is sprayed from the nozzle 2; and when the single press is released, the lower spring 12 rebounds, the valve needle 11 and the valve rod 4 move up, the piston 10 is in contact with the press-fit portion 1103 of the valve needle 11 to implement closure, the valve needle 11 continues moving up, and the liquid volume and the pressure intensity in the liquid cavity 1301 are increased and reduced, such that the liquid generates the suction force to suck up the steel ball 14, and the liquid in the suction tube 15 is supplied to the liquid cavity 1301 from the gap between the steel ball 14 and the inward retraction portion 1303 through the liquid hole 1305.

Finally, it should be noted that the above is only the preferred embodiment of the present invention and is not intended to limit the present invention; while the present invention has been described in detail with reference to the foregoing embodiment, those skilled in the art still may modify the technical solution recited in the foregoing embodiment, or equivalently substitute some of the technical features therein; and any modifications, equivalent substitutions, improvements, etc. made within the spirit and principle of the present invention should all be included in the scope of protection of the present invention.

What is claimed is:

1. A short and small continuous sprayer, comprising a spray head, wherein the spray head is connected to a valve rod, the valve rod is provided with a retaining cavity, the retaining cavity is provided with an upper spring, the upper spring is connected to a piston, a valve needle is arranged in the piston and sleeved on the valve rod, and an inner cavity is formed between the piston and the valve needle;

the piston is sleeved with a cylinder body, a liquid cavity is formed between the cylinder body and the piston, the cylinder body is connected to a lower spring, and the lower spring is connected to the valve needle;

the cylinder body is provided with a moving cavity, a steel ball is arranged in the moving cavity, and the moving cavity is provided with a suction tube in a communication manner; and the valve rod moves down to drive the valve needle and the piston to move down to increase a liquid pressure in the liquid cavity, the lower spring is compressed, and when the liquid pressure in the liquid cavity is increased till a sum of the liquid pressure and an elastic force of the lower spring is greater than an elastic force of the upper spring, the piston moves up, the piston is separated from the valve needle, a liquid in the liquid cavity flows into the inner cavity from a gap between the piston and the valve needle, and the liquid in the inner cavity enters the spray head through the valve rod.

2. The short and small continuous sprayer of claim 1, wherein a flow channel is formed in a center of the valve rod, an annular bulge portion is arranged on an inner wall of the flow channel, and the valve rod is provided with a clamping ring.

3. The short and small continuous sprayer of claim 2, wherein the valve needle is fixedly connected to the valve rod, the valve needle is provided with a recess portion, the bulge portion is embedded into the recess portion, the valve needle is provided with a cut surface and a press-fit portion, and the press-fit portion is shaped like an annular inclined cut surface.

4. The short and small continuous sprayer of claim 3, wherein the piston is provided with an upper mounting portion fixedly connected to one end of the upper spring, the other end of the upper spring is fixedly mounted in the retaining cavity, and an attaching portion is arranged below the upper mounting portion.

5. The short and small continuous sprayer of claim 2, wherein the valve rod is sleeved with a bushing, the bushing is provided with a sealing portion and fixedly mounted with a small gasket, and the small gasket is fixedly mounted with a middle sleeve.

6. The short and small continuous sprayer of claim 5, wherein the middle sleeve is provided with a clamping portion and fixedly mounted with a large gasket, the large gasket is fixedly mounted on the cylinder body, and the cylinder body is fixedly connected to the middle sleeve.

7. The short and small continuous sprayer of claim 6, wherein the cylinder body is provided with a through hole, an embedded groove, and a recess, the embedded groove is attached to the sealing portion, and the recess is attached to the clamping portion.

8. The short and small continuous sprayer of claim 1, wherein an inward retraction portion is arranged on an inner wall of the moving cavity, a clamping ball is fixedly mounted on the inner wall of the moving cavity and arranged above the steel ball, and a liquid hole is formed below the moving cavity.

9. The short and small continuous sprayer of claim 8, wherein a channel is arranged below the liquid hole, a flange is arranged on an inner wall of the channel, and the suction tube is arranged in the channel.

10. The short and small continuous sprayer of claim 1, wherein the spray head is provided with a nozzle, fixedly mounted with a protective shell, and fixedly connected to the valve rod.

* * * * *